(12) United States Patent
Sorbara et al.

(10) Patent No.: US 7,925,935 B2
(45) Date of Patent: Apr. 12, 2011

(54) BACK CHANNEL COMMUNICATION

(75) Inventors: Massimo Sorbara, Freehold, NJ (US);
Patrick Duvaut, Tinton Falls, NJ (US);
Yan Wu, Morganville, NY (US)

(73) Assignee: Ikanos Communications, Inc., Fremont, CA (US)

( * ) Notice: Subject to any disclaimer, the term of this patent is extended or adjusted under 35 U.S.C. 154(b) by 387 days.

(21) Appl. No.: 12/100,355

(22) Filed: Apr. 9, 2008

(65) Prior Publication Data

US 2008/0263413 A1    Oct. 23, 2008

Related U.S. Application Data

(60) Provisional application No. 60/922,498, filed on Apr. 9, 2007.

(51) Int. Cl.
*G06F 11/00* (2006.01)
*G01R 31/28* (2006.01)
*H04B 1/38* (2006.01)
*H04B 3/46* (2006.01)

(52) U.S. Cl. ............ 714/701; 714/48; 714/57; 714/712; 714/715; 375/220; 375/224; 375/240.27; 370/242

(58) Field of Classification Search .................... 714/48, 714/57, 701, 712, 715; 375/220, 224, 240.27; 370/242
See application file for complete search history.

(56) References Cited

U.S. PATENT DOCUMENTS

| | | | |
|---|---|---|---|
| 2002/0107979 A1 | 8/2002 | Samikowski et al. | |
| 2002/0116715 A1* | 8/2002 | Apostolopoulos | 725/86 |
| 2002/0138848 A1 | 9/2002 | Alao et al. | |
| 2003/0007509 A1 | 1/2003 | Tzannes et al. | |
| 2004/0047424 A1* | 3/2004 | Ramaswamy et al. ... | 375/240.27 |
| 2005/0030964 A1 | 2/2005 | Tiedemann, Jr. et al. | |
| 2006/0159116 A1 | 7/2006 | Gerszberg et al. | |

OTHER PUBLICATIONS

Duvaut et al., Conexant Systems, "G.vdsl: Proposed Requirements on Back Channel for Estimating MIMO Channel in VDSL2", CD-041, Denver, Colorado, Sep. 25-29, 2006.*
PCT Written Opinion mailed Jun. 27, 2008.

* cited by examiner

*Primary Examiner* — John J Tabone, Jr.

(57) ABSTRACT

Included are embodiments for back channel communication. At least one embodiment of a method includes receiving data at customer premises equipment and determining at least one error in the received data. Some embodiments include formatting the determined error for communication to a central office and sending the formatted error to the central office via a back channel.

17 Claims, 5 Drawing Sheets

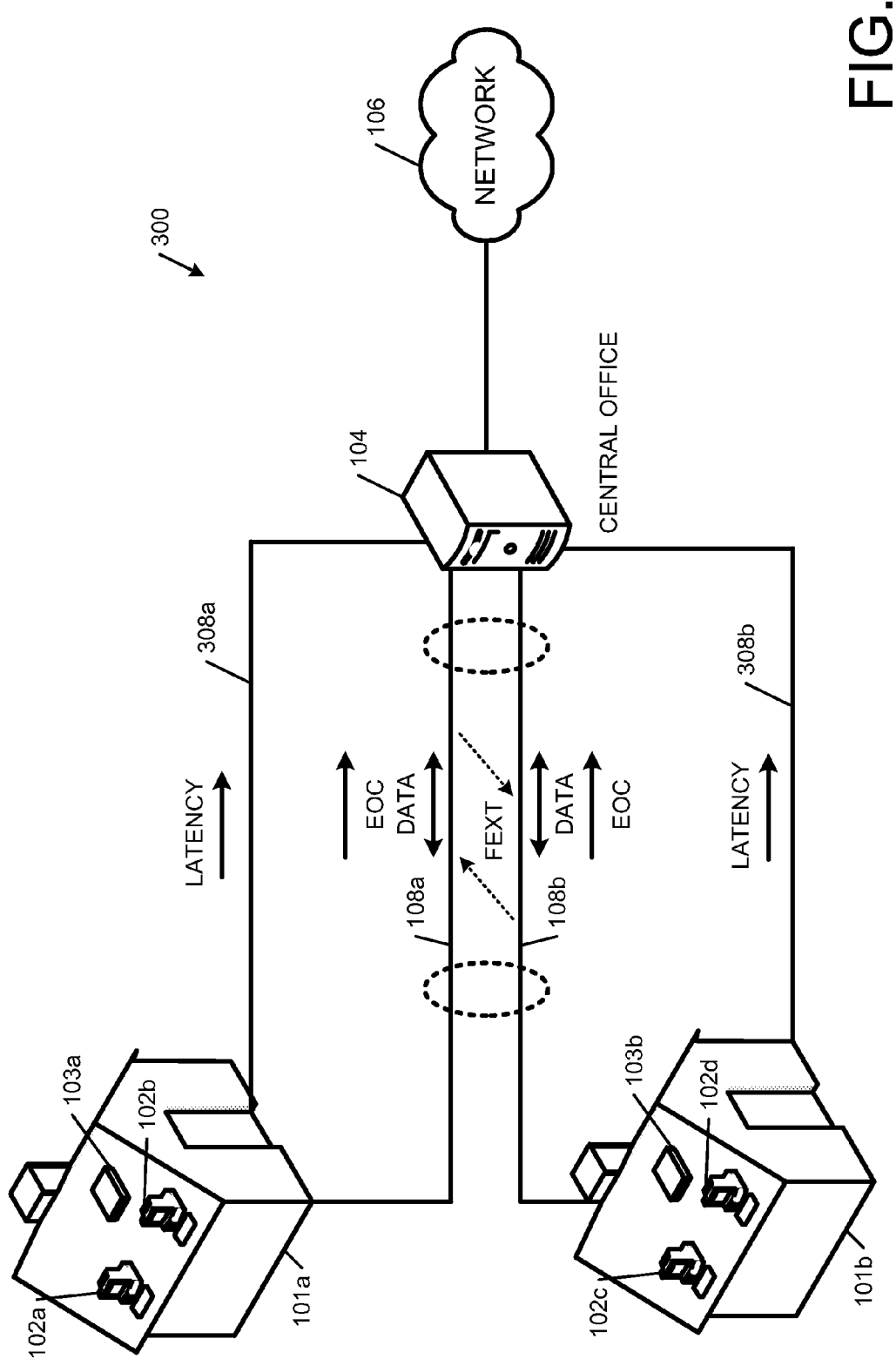

BACK CHANNEL COMMUNICATION

CROSS REFERENCE

This application claims the benefit of U.S. Provisional Application No. 60/922,498, filed Apr. 9, 2007, which is hereby incorporated by reference in its entirety.

BACKGROUND

In communications environments, such as environments that utilize digital subscriber line (DSL) technologies with wide bandwidths, self-crosstalk, specifically self far-end crosstalk (SFEXT) is the dominant disturber in the cable that impedes communications. Accordingly, compensation or cancellation of such self-crosstalk noise is desired. Additionally, while customer premises equipment (CPE) may be configured to detect error, difficulty may result in communicating data back to a central office (CO).

SUMMARY

Included are embodiments for back channel communication. At least one embodiment of a method includes receiving data at customer premises equipment and determining at least one error in the received data. Some embodiments include formatting the determined error for communication to a central office and sending the formatted error to the central office via a back channel.

Also included are embodiments of a system. Some embodiments include a receiving component configured to receive data at customer premises equipment and a determining component configured to determine at least one error in the received data. Similarly, some embodiments include a formatting component configured to format the determined error for communication to a central office and a sending component configured to send the formatted error to the central office via a back channel.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 3 depicts an additional exemplary embodiment of a network diagram, illustrating utilization of a latency channel for communicating error signals to the central office, similar to the network configuration, from FIG. 1.

DETAILED DESCRIPTION

Figure 1:
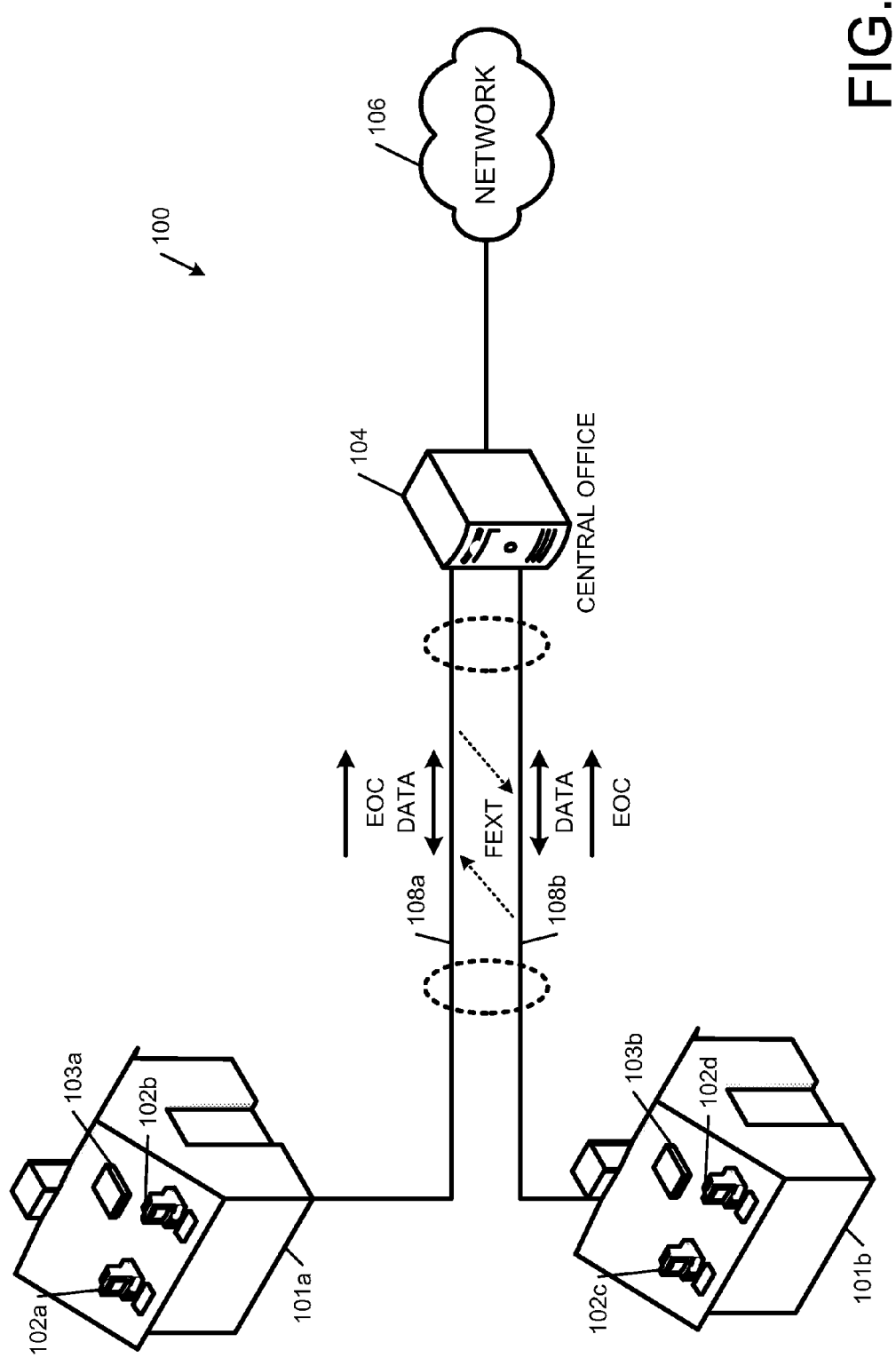
FIG. 1 depicts an exemplary embodiment of a network configuration, which may be configured for communicating data.

With regard to far end crosstalk (FEXT) cancellation, some embodiments disclosed herein include passing error signal (error(f)) samples from a customer premises (CPE) to a central office (CO) in support of channel estimation processing for FEXT cancellation. Similarly, some embodiments include an implementation of a back channel in very high speed digital subscriber line 2 (VDSL2) environments. At least one embodiment includes utilizing an existing embedded operations channel (EOC), where a new set of commands are defined specific to the back channel. In such a configuration, a sync frame may be a reference mechanism for identifying the specific data symbols for passing of error samples.

Similarly, a dedicated latency path that is configured for implementation of the back channel may be defined. In some embodiments, data frames are sent via a back channel may be synchronous to a discrete multitone (DMT) superframe, thus facilitating identification of the specific data frames for error sample measurements.

Some exemplary embodiments disclosed herein may be configured with data rates for the back channel of 128 kb/s, regardless of implementation. However, one should note that this is a nonlimiting example. Additionally, the available bit rate for the back channel may have an impact on the convergence time for the FEXT cancellation algorithms. Additionally, the error(f) samples may be used for correlation with actual data symbols and/or with the data samples associated with orthogonal sequences.

Some embodiments may be utilized to identify the one or more specific tones for the specific data symbol(s). One may also note that when passing error sample information in the back channel, a cyclic redundancy check (CRC) may be provided for error detection. If an error is detected in the received packet, the information may be discarded. In at least one exemplary embodiment, the error(f) samples may only be processed for the packets received without error.

As discussed above, 128 kb/s may be a bit rate utilized for the back channel. One should note that the EOC may also be used to support other operations, such as online reconfiguration (OLR) commands like bit swap and seamless rate adaptation (SRA), and for commands in support of impulse noise monitor functions. If 128 kb/s of capacity are allocated for the EOC, then this capacity may be available for all of the commands and operations performed via the EOC. In other embodiments, 256 kb/s (or more) of capacity may be allocated for the EOC.

One may also note that the EOC may be decoupled from the DMT superframe. As is done with the OLR commands, a sync flag may be used as a reference for initiating the specific back channel command and may also serve as a point of reference for identifying specific data frames relative to the position of the sync flag.

Similarly, in another embodiment, a group of tones, similar to having a separate latency path dedicated to back channel implementation may be defined. The group of tones and associated parameters of the back channel may be negotiated via handshake at initialization. Additionally, in some embodiments, the back channel data frames may be synchronous to the DMT superframe, hence, identification of specific data frames for measurement of error samples is relatively straightforward. Additionally, measurement of round trip delay for the back channel may be measured at initialization.

Referring now to the drawings, FIG. 1 depicts an exemplary embodiment of a network configuration 100, which may be configured for communicating data. As illustrated in the nonlimiting example of FIG. 1, users may subscribe to digital subscriber line (DSL) services, such as very high speed DSL (VDSL) and receive these services at customer premises 101*a* and 101*b*. The customer premises 101*a* may be connected to the CO 104 on one wire pair 108*a*, which is terminated with customer premises equipment (CPE) 103*a*. The CPE 103*a* may include any equipment configured to receive data from a central office (such as CO 104) and may be coupled to a single DSL account; however this is not a requirement.

Additionally, the CPE 103*a* may be coupled to one or more computing devices 102*a*, 102*b*. The CPE 103*a* may be configured as a recipient and/or provider of information between the computing devices 102*a*, 102*b* and a central office (CO) 104.

Similarly, the customer premises 101*b* may be coupled to computing devices 102*c*, 102*d*, as well as being coupled to the CO 104 on a second wire pair 108*b*, which is terminated with customer premises equipment (CPE) 103*b*. Similar to the CPE 103*a*, the CPE 103*b* may include any equipment configured to receive data from a central office (such as CO 104) and may be coupled to a single DSL account; however this is not a requirement.

The central office 104 may include any configuration that may facilitate providing data to the CPEs 103*a*, 103*b* and may include any equipment and/or logic configured to provide and/or receive data from the customer premises equipment 102, 103. More specifically, the central office 104 may include a DSL access multiplexor (DSLAM), server, switch, personal computer, and/or other equipment. The central office 104 may also be coupled to a network 106. The network 106 may include the Internet, a public switched telephone network (PSTN), an integrated services digital network (ISDN) or other wide area network or local area network.

As discussed above, such a configuration of components may introduce far end crosstalk among lines 108*a* and 108*b*. The line 108*a* may include a twisted pair and may be configured to send data between the CO 104 to the CPE 103*a*. Similarly, the line 108*b* may include a twisted pair and may be configured for sending data between the CPE 103*b* to the CO 104.

Additionally, depending on the particular configuration, the lines 108*a*, 108*b* may be configured to send data according to one or more channels. The one or more channels may include an embedded operations channel (EOC), which may be configured to support remote management operations such as provisioning, maintenance, protection switching, and alarm surveillance, and/or other operations.

As discussed above, one issue present in many network configurations, such as in the network configuration 100 from FIG. 1, is far end crosstalk (FEXT), which may develop between the lines 108*a* and 108*b*. Accordingly, in at least one exemplary embodiment, the CPE 103*a* may be configured to determine error signals on the data sent on line 108*a* that resulted from FEXT due to line 108*b* (and/or due to other lines). The CPE 103*a* may also be configured to format the compiled error signals into data frames synchronous to the transmission in a discrete multitone (DMT) superframe via a back channel. The CO 104 may be configured to receive the formatted error signals and determine the nature of the errors encountered due to the FEXT. Additionally, depending on the particular configuration, CPE 103*b* may be similarly configured.

Figure 2:
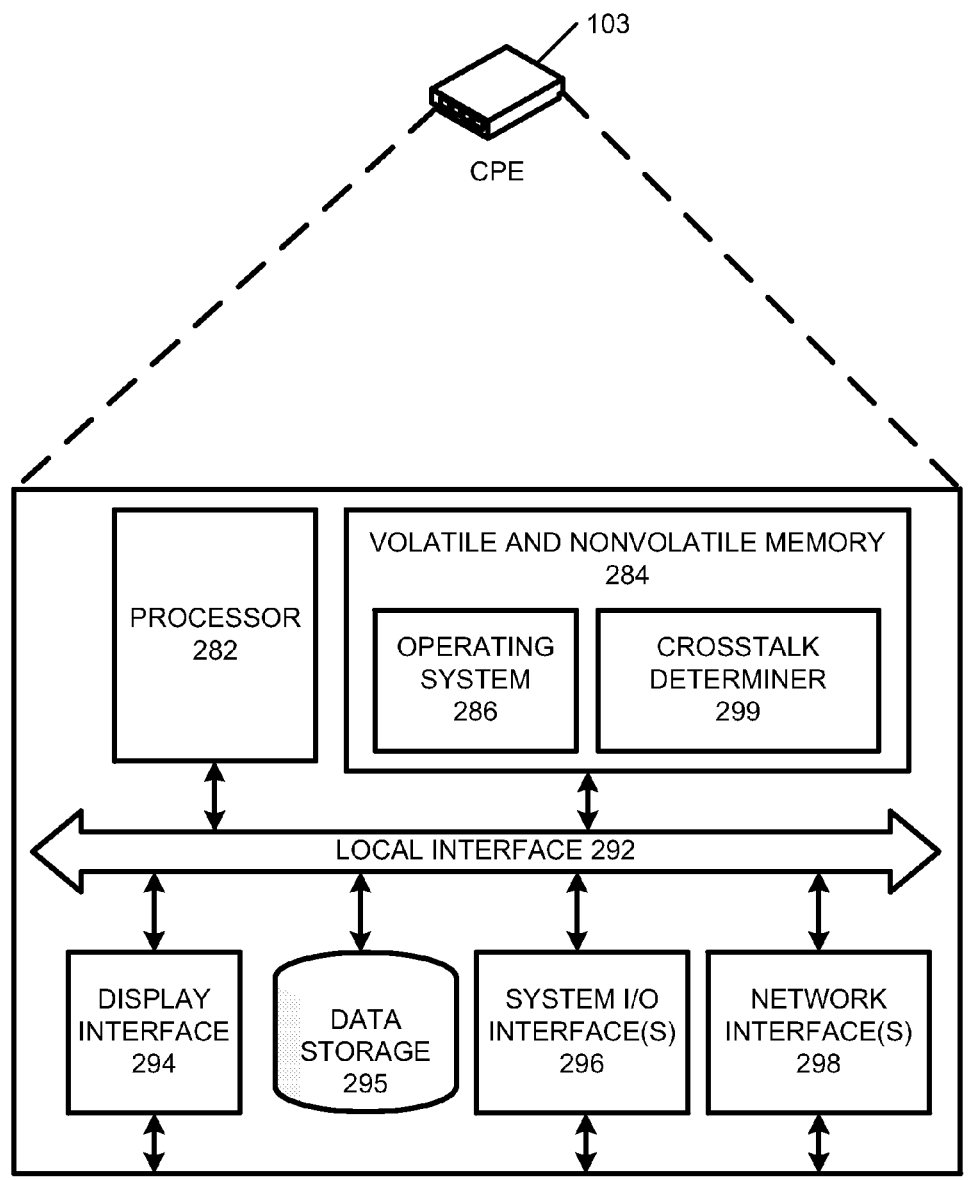
FIG. 2 depicts an exemplary embodiment of the customer premises equipment (CPE), which may be configured for facilitating communication in the network configuration from FIG. 1.

FIG. 2 depicts an exemplary embodiment of the customer premises equipment (CPE) 103, which may be configured for facilitating communication in the network configuration 100 from FIG. 1. As illustrated in FIG. 2, in terms of hardware architecture, the CPE 103 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the CPE 103, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/or other types of storage media. One should note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include a crosstalk determiner 299, as well as an operating system 286. As discussed in more detail below, the crosstalk determiner 299 may be configured to not only determine crosstalk error with regard to received data, but format the determined error, send to the central office 104 via a back channel, as well as perform other operations. Other components may also be included.

Additionally, while the logic components 286 and 299 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be structured as a source program, executable program (object code), script, and/or any other entity that includes a set of instructions to be performed. When constructed as a source program, the program is translated via a compiler, assembler, interpreter, or the like, which may or may not be included within the volatile and nonvolatile memory 284, so as to operate properly in connection with the operating system 286.

The input/output devices that may be coupled to system I/O interface(s) 296 may include input devices, for example but not limited to, a keyboard, mouse, scanner, microphone, camera, proximity device, receiver, etc. Further, the input/output devices may also include output devices, for example but not limited to, a printer, display, transmitter, etc. The input/output devices may further include devices that communicate both as inputs and outputs, for instance but not limited to, a modulator/demodulator (modem for accessing another device, system, or network), a radio frequency (RF) or other transceiver, a telephonic interface, a bridge, a router, WIFI communications device, WiMAX communications device, bluetooth communications device, etc. Similarly, a network interface 298, which is coupled to local interface 292, can be configured to communicate with a communications network, such as the network 100 from FIG. 1. While this communication may be facilitated via the CPE 103, this is not a requirement.

More specifically, the network interface 298 may be configured for facilitating communication with one or more devices. The network interface 298 may include any component configured to facilitate a connection with another device. While in some embodiments, among others, the CPE 103 can include the network interface 298 that includes a Personal Computer Memory Card International Association (PCMCIA) card (also abbreviated as "PC card") for receiving a wireless network card, this is a nonlimiting example. Other configurations can include the communications hardware within the client device 102, such that a wireless network card is unnecessary for communicating wirelessly. Similarly, some embodiments may include the network interface 298 for communicating via a wired connection. Such interfaces may be configured with universal serial bus (USB) interfaces, serial ports, and/or other interfaces. In operation, the wireless network interfaces 298 may be configured to communicate with other CPEs 102, 103, and other wireless devices via a wireless local area network (WLAN) or other wireless network.

If the CPE 103 includes a personal computer, workstation, or the like, the software in the memory component 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the CPE 103 is activated.

When the CPE 103 is in operation, the processor 282 can be configured to execute software stored within the memory component 284, to communicate data with the memory component 284, and to generally control operations of the CPE 103 pursuant to the software. Software in memory 284, in whole or in part, may be read by the processor 282, perhaps buffered within the processor 282, and then executed. Additionally, one should note that while the above description is directed to the CPE 103, other devices can also include the components described in FIG. 2.

One should note that the CPE 103, the computing devices 102, and/or the CO 104 can be configured with one or more of the components and/or logic described above with respect to the CPE 103. Additionally, the CPE 103, the computing devices 102, the CO 103, and/or other components of FIG. 1 can include other components and/or logic for facilitating the operations described herein.

FIG. 3 depicts an additional exemplary embodiment of a network diagram 300, illustrating utilization of a latency channel for communicating error signals to the central office 104, similar to the network configuration 100, from FIG. 1. Similar to the diagram from FIG. 1, the network diagram 300 includes the customer premises 101a, 101b, the computing devices 102a, 102b, 102c, 102d, and the CPEs 103a, 103b. Additionally, as in FIG. 1, the central office 104 may be configured to communicate data with the CPEs 103a, 103b (and/or other CPEs), creating FEXT.

However, while the network configuration 100 utilized the EOC for communication of compiled error data, the nonlimiting example of FIG. 3 utilizes a dedicated latency channels 308a 308b to communicate this data back to the CO 104. Additionally, while the latency channels 308a, 308b are illustrated as separate lines for CPEs 103a, 103b, respectively, one should note that this is a nonlimiting example, as in at least one exemplary embodiment, the dedicated latency channels may be configured for transmission on the lines 108a 108b, respectively.

Figure 4A:
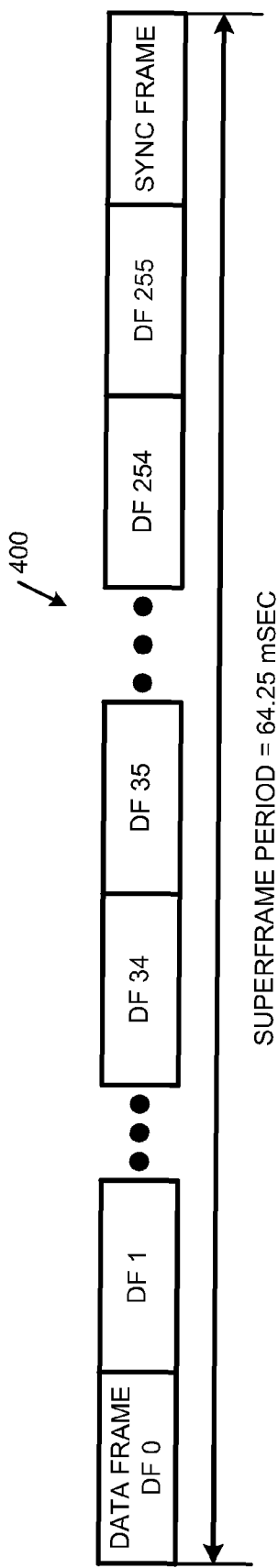
FIG. 4A depicts an exemplary embodiment of a structure of a DMT superframe, such as may be utilized in the network from FIG. 1.

FIG. 4A depicts an exemplary embodiment of a structure of a DMT superframe 400, such as may be utilized in the network from FIG. 1. As illustrated in the nonlimiting example of FIG. 4A, the DMT superframe 400 may include 256 data frames and a sync frame. Additionally, in this nonlimiting example the superframe period may be 64.25 milliseconds. One should note, however, this is not a requirement.

Figure 4B:
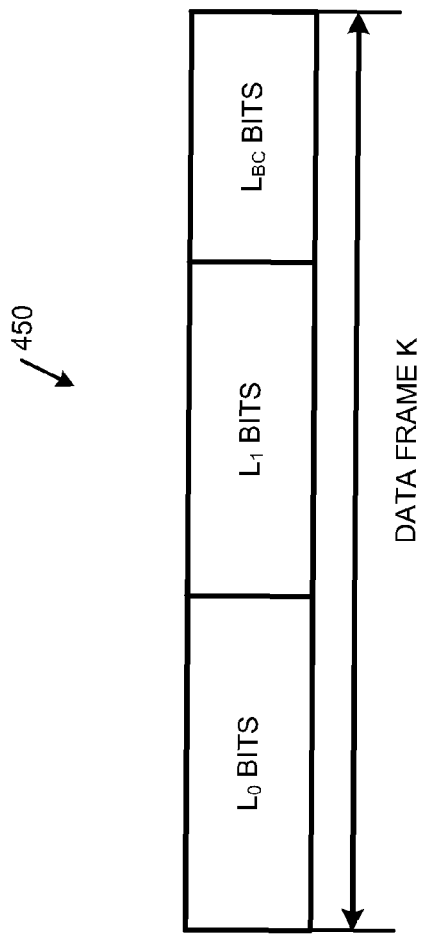
FIG. 4B depicts an exemplary embodiment of a structure of one data frame in the DMT superframe from FIG. 4A.

FIG. 4B depicts an exemplary embodiment of a structure of one data frame 450 in the DMT superframe from FIG. 4A. As illustrated in the nonlimiting example of FIG. 4B, the data frame K 450 may be utilized in the dedicated latency channel from FIG. 3 and include bit allocations $L_0$, $L_1$, and $L_{BC}$. For 128 kb/s operation, 32 bits may be allocated per data frame. To maximize robustness, specific tones with a reduced bit load may be allocated for the back channel. In at least one exemplary embodiment, the error data may be designated to the $L_{BC}$ portion of the data frame 450.

Figure 5:
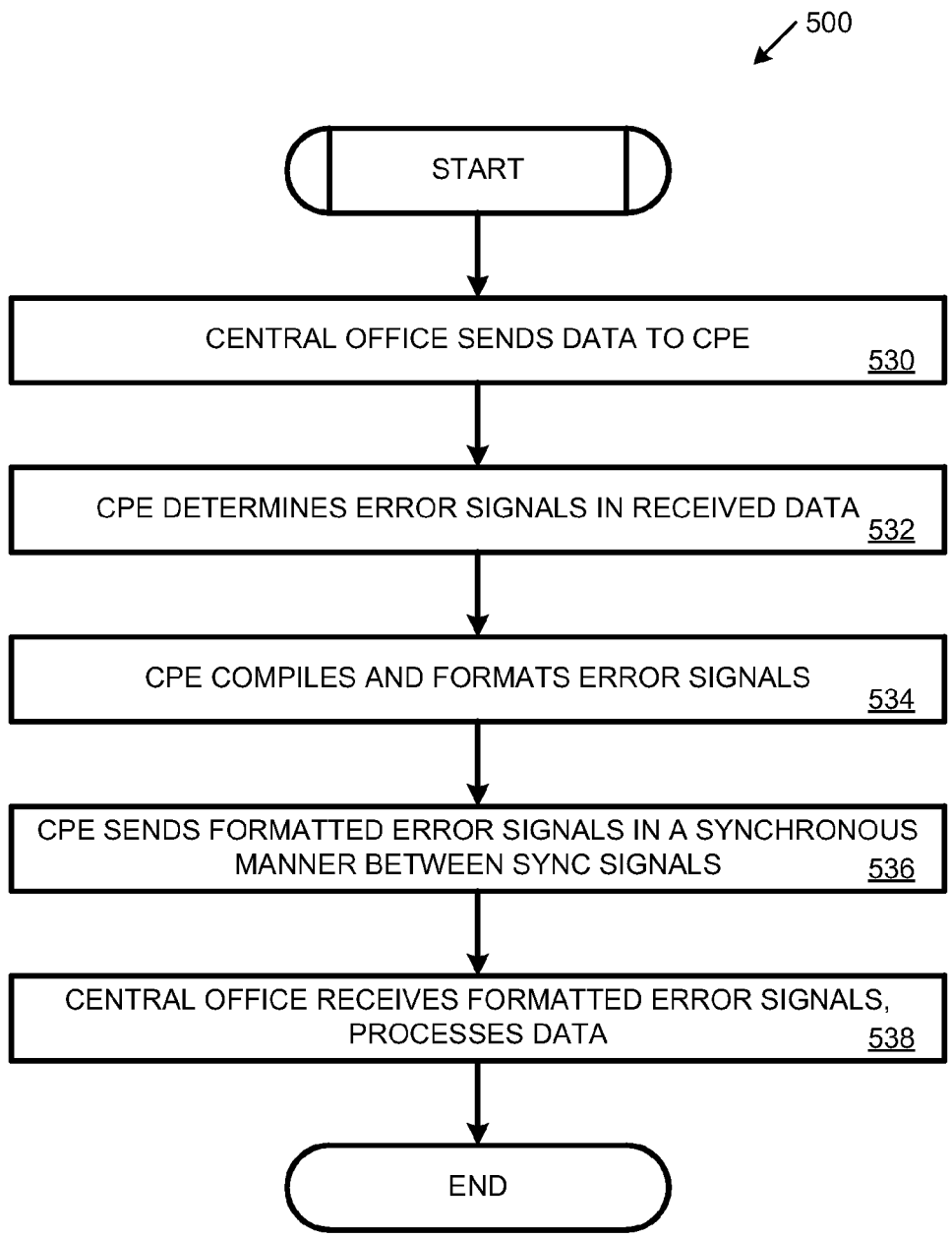
FIG. 5 depicts an exemplary embodiment of flowchart that may be utilized for communicating error data to the central office, such as in the network configuration from FIG. 1.

FIG. 5 depicts an exemplary embodiment of flowchart 500 that may be utilized for communicating error data to the central office 104, such as in the network configuration 100 from FIG. 1. As illustrated in the nonlimiting example of FIG. 5, the central office 104 may send data to the CPE 103 (block 530). The data sent may include Internet data, television data, voice data, and/or other types of data. Additionally, the CPE 103 can determine error signals in the received data (block 532). The CPE may also compile and format the determined error signals (block 534). More specifically, as discussed above, the determined error signals may be compiled and formatted for transmission via the EOC, via a dedicated latency channel, and/or via other modes of communication. The data may be formatted as discussed with regard to FIGS. 4A and 4B; however this is not a requirement. Additionally, the CPE 103 can send formatted error signals in a synchronous manner between sync signals of a DMT superframe (block 536). The central office 104 may receive the formatted error signals, and process the received data (block 538).

The embodiments disclosed herein, such as flowchart 500, crosstalk determiner 299, and/or other components can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

Similarly, some embodiments of a process may include receiving data at the CPE 103 encoded as orthogonal pilot sequences in the sync symbol of a DMT super frame, measuring error samples for identified DMT sub-carriers, and report the error samples back to the CO via the back channel. Similarly, some embodiments may include measuring error samples for identified DMT sub-carrier relative to specific transmitted data symbols, and report the error samples to the CO via the back channel.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method comprising:
  receiving data at customer premises equipment;
  determining at least one error in the received data;
  formatting the determined error for communication to a central office; and
  sending the formatted error to the central office via a back channel;
  wherein the formatted error is sent between a first sync frame and a second sync frame of a discrete multitone (DMT) superframe.

2. The method of claim 1, wherein the formatted error is sent via the back channel embodied as an embedded operational channel (EOC).

3. The method of claim 1, wherein the formatted error is sent via the back channel embodied as a dedicated latency channel.

4. The method of claim 1, further comprising utilizing a cyclic redundancy check (CRC) for error detection.

5. The method of claim 1, wherein the error is sent to the central office for far end crosstalk (FEXT) error correction.

6. The method of claim 1, further comprising utilizing a sync frame as a reference mechanism to identify specific data symbols for passing of the formatted error.

7. A system comprising:
  a receiving component configured to receive data at customer premises equipment;
  a determining component configured to determine at least one error in the received data;
  a formatting component configured to format the determined error for communication to a central office; and
  a sending component configured to send the formatted error to the central office via a back channel;
  wherein the formatted error is sent between a first sync frame and a second sync frame of a discrete multitone (DMT) superframe.

8. The system of claim 7, wherein the formatted error is sent via the back channel embodied as an embedded operational channel (EOC).

9. The system of claim 7, wherein the formatted error is sent via the back channel embodied as a dedicated latency channel.

10. The system of claim 7, further comprising utilizing a cyclic redundancy check (CRC) for error detection.

11. The system of claim 7, wherein the error is sent to the central office for far end crosstalk (FEXT) error correction.

12. The system of claim 7, further comprising a utilizing component configured to utilize a sync frame as a reference mechanism to identify specific data symbols for passing of the formatted error.

13. The system of claim 7, wherein the system is embodied in a non-transitory computer readable medium.

14. A system comprising:
  means for receiving data at customer premises equipment;
  means for determining at least one error in the received data;

means for formatting the determined error for communication to a central office; and means for sending the formatted error to the central office via a back channel;

wherein the formatted error is sent between a first sync frame and a second sync frame of a discrete multitone (DMT) superframe.

15. The system of claim 14, wherein the formatted error is sent via the back channel embodied as an embedded operational channel (EOC).

16. The system of claim 14, wherein the formatted error is sent via the back channel embodied as a dedicated latency channel.

17. The system of claim 14, further comprising means for utilizing a sync frame as a reference mechanism to identify specific data symbols for passing of the formatted error.

* * * * *